W. AUBERLIN.
ARTIFICIAL BAIT.
APPLICATION FILED JUNE 4, 1921.

1,415,913.

Patented May 16, 1922.

INVENTOR
William Auberlin
BY John A. Bornhardt
ATT'Y

UNITED STATES PATENT OFFICE.

WILLIAM AUBERLIN, OF NORTHFIELD, OHIO.

ARTIFICIAL BAIT.

1,415,913.  Specification of Letters Patent.  Patented May 16, 1922.

Application filed June 4, 1921. Serial No. 474,947.

*To all whom it may concern:*

Be it known that I, WILLIAM AUBERLIN, a citizen of the United States, residing at Northfield, in the county of Summit and State of Ohio, have invented certain new and useful Improvements in Artificial Bait, of which the following is a specification.

This invention relates to artificial bait and has for its object to provide an improved bait of the spinner type which can be cheaply and easily constructed and which will effectively serve the intended purpose.

Figure 1:
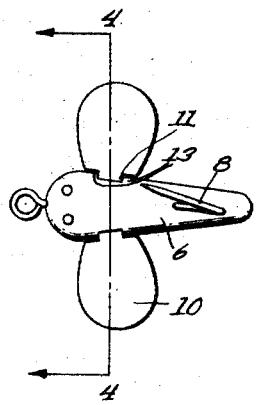
Figure 2:
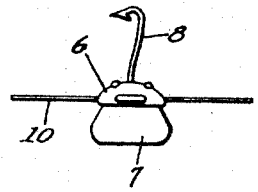
Figure 3:
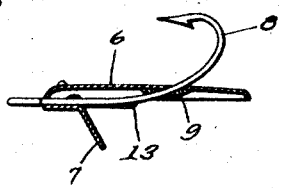
Figure 4:
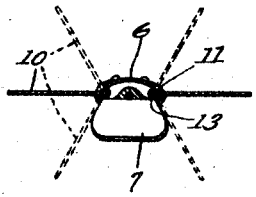
Figure 5:
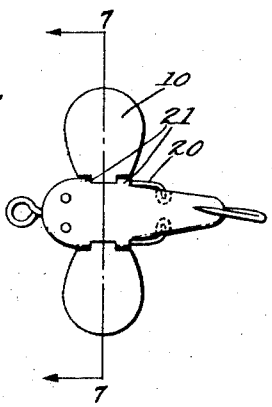
Figure 6:
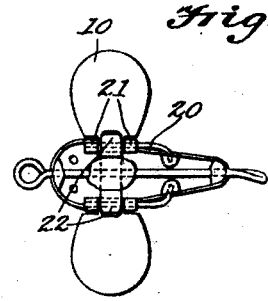
Figure 7:
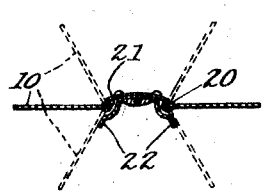

The invention is illustrated in the accompanying drawings in which Fig. 1 is a plan of the bait. Fig. 2 is an end view. Fig. 3 is a central longitudinal section. Fig. 4 is a section on the line 4—4 of Fig. 1. Fig. 5 is a plan of a modification. Fig. 6 is a bottom plan of the same. Fig. 7 is a section on the line 7—7 of Fig. 5.

The device is so constructed that the parts thereof may be made of metal stampings, and referring to the forms shown in Figs. 1, 2, 3 and 4, 6 indicates an elongated convex or dished body the under side of which is concave and has depending therefrom, near the front end, an inclined tongue or blade 7, these parts 6 and 7 being pressed from one piece of sheet metal. The blade 7 extends laterally across under the body and is inclined downwardly and backwardly so that when the device is drawn through the water it will tend to jump or rise and fall in consequence of the inclination of the said tongue 7. The hook 8 projects above the body 6, the shank of the hook being extended through a hole in the body, where it is fastened as by a drop of solder 9, and out through the front end or head for attachment to the line. A pair of wings 10 are hinged at 11 to opposite sides of the body, the hinges being of simple construction formed by bending tongues 13 at the edge of the body around pins or projections on the wings, sufficiently loose to permit the wings to rise and fall as shown in Fig. 4 in course of the movement of the body through the water. The whole will give the appearance of a fly and it may be decorated as desired, to imitate flies of different kinds. It is obvious that it may be cheaply constructed, mainly of sheet metal stampings, and when drawn through the water will have a movement simulating a natural fly.

In the form shown in Figs. 5, 6 and 7 the wings are hinged to small wires 20 fixed to the under side of the body and held by tongues 21 bent over the wires, and the under side of the body is provided with a pair of tongues 22 soldered thereto and acting as stops to limit the downward movement or flap of the wings 10.

In the form shown in Fig. 4 the downward flap of the wings is limited by the tongue 7 against which the wings strike. In both of the forms, in consequence of the structure and connection of the wings the up and down movement or flap of the wings is limited and the wings will extend outwardly or project in all positions of the body and will prevent the wings from collapsing in any position. The concave body and the wings having limited movement will insure life-like activity of the body when in use.

I claim:

1. An artificial bait comprising a body provided with hinged wings at the sides and having a projection on the under side to limit the downward movement of the wings.

2. An artificial bait comprising a sheet metal body concave on the under side, and a pair of hinged wings at opposite edges of the body.

3. An artificial bait comprising a concave sheet metal body having a downwardly projecting tongue, and a pair of wings hinged to the sides of the body and adapted to stop against said tongue when partly folded.

4. An artificial bait comprising a concave sheet metal body, a pair of wings hinged to the opposite edges of the body, stops for the wings projecting from the under side of the body, and a hook secured to the body.

5. An artificial bait comprising a sheet metal body, concave on the under side and having a depending tongue on the under side projecting downwardly and backwardly, and a pair of wings hinged to opposite sides of the body and adapted to stop against said tongue.

In testimony whereof, I affix my signature in presence of two witnesses.

WILLIAM AUBERLIN.

Witnesses:
 JOHN A. BUMMHARDT,
 BESSIE F. POLLAK.